(12) United States Patent
Fouquet

(10) Patent No.: US 8,145,211 B2
(45) Date of Patent: Mar. 27, 2012

(54) CONTINUITY OF SERVICES BY THE USE OF A BACKUP HLR

(75) Inventor: Matthieu Fouquet, Meudon (FR)

(73) Assignee: Bouygues Telecom, Boulogne Billancourt (FR)

( * ) Notice: Subject to any disclaimer, the term of this patent is extended or adjusted under 35 U.S.C. 154(b) by 788 days.

(21) Appl. No.: 12/027,577

(22) Filed: Feb. 7, 2008

(65) Prior Publication Data

US 2008/0220774 A1   Sep. 11, 2008

(30) Foreign Application Priority Data

Feb. 15, 2007   (FR) ...................................... 07 53268

(51) Int. Cl.
  *H04W 4/00*   (2009.01)
  *H04W 24/00*  (2009.01)
(52) U.S. Cl. ..................................... 455/433; 455/456.1
(58) Field of Classification Search .................. 455/433,
  455/432.2, 435.2, 440, 445, 414.1, 414.2,
  455/418–420, 456.1, 456.2, 456.5
  See application file for complete search history.

(56) References Cited

U.S. PATENT DOCUMENTS

| 5,623,532 | A | * | 4/1997 | Houde et al. .................. 455/445 |
| 5,953,662 | A | * | 9/1999 | Lindquist et al. ............. 455/433 |
| 6,097,942 | A | * | 8/2000 | Laiho .......................... 455/414.1 |
| 6,144,857 | A | * | 11/2000 | Price et al. ..................... 455/445 |
| 6,718,173 | B1 | | 4/2004 | Somani et al. |
| 7,013,139 | B1 | * | 3/2006 | Gan et al. .................... 455/432.3 |
| 7,120,451 | B2 | * | 10/2006 | Agarwal et al. ............ 455/456.2 |
| 7,142,862 | B2 | * | 11/2006 | Halsell ......................... 455/445 |
| 2009/0264122 | A1 | * | 10/2009 | Van Loon et al. ............. 455/433 |

FOREIGN PATENT DOCUMENTS

WO   WO 97/42783   11/1997

* cited by examiner

*Primary Examiner* — George Eng
*Assistant Examiner* — Scott Au
(74) *Attorney, Agent, or Firm* — Harness, Dickey & Pierce, P.L.C.

(57) ABSTRACT

The present invention relates to the field of mobile telephony networks and more particularly to a device, a system and an associated method for ensuring continuity of telephony services on the network. The invention is based on the use, as a temporary backup for faulty HLR equipment, of HLR equipment possibly initially empty of any user data and which, during location demands from non-referenced subscribers, on its own initiative actuates the CIS information system in order to recover a minimum of data allowing identification of the subscriber on the network and therefore his activation. No synchronization with the active HLRs is necessary since the data are recovered as necessary on the information system. In addition, the updating data traffic between active HLRs and backup HLR is avoided.

20 Claims, 1 Drawing Sheet

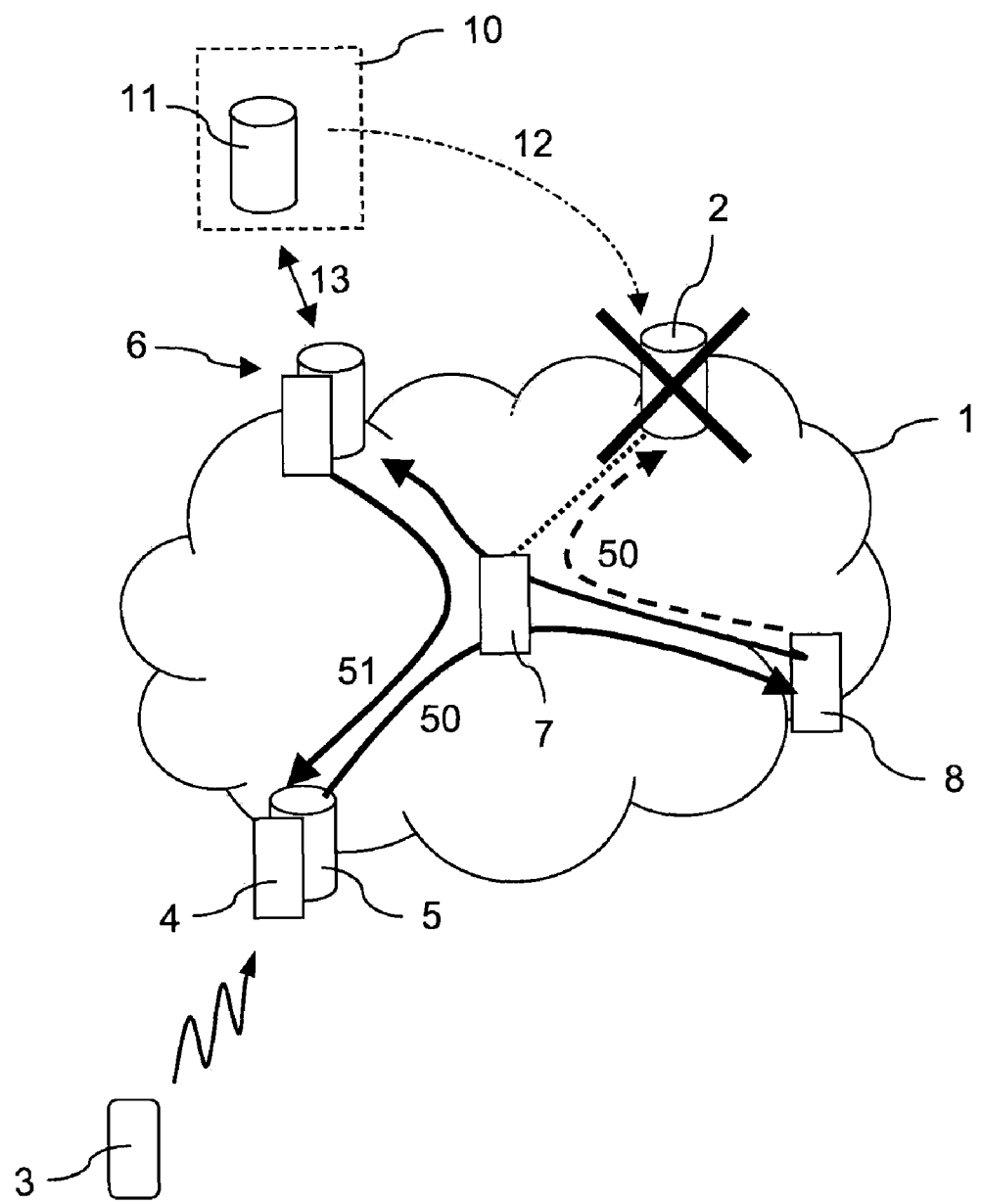

CONTINUITY OF SERVICES BY THE USE OF A BACKUP HLR

CROSS REFERENCE TO RELATED APPLICATION

This application claims priority to French Application No. 0753268, filed Feb. 15, 2007, which is incorporated by reference herein.

BACKGROUND AND SUMMARY

The present invention relates to the field of mobile telephony networks and more particularly to a device, a system and an associated method for ensuring continuity of telephony services on the network.

Mobile telephony networks comprise an important item of equipment, called the nominal location register (HLR—Home Location Register), which officiates as a central database containing all the data relating to each of the subscribers authorised to use the mobile network. This database is generally distributed over several items of HLR equipment for practical reasons of processing and storage capacity. The database is automatically filled when a new subscriber is registered with a telephony operator. The commercial information system (CIS) from which the commercial service proceeds with the contractual registration of the new subscriber updates the HLR database with the new data entered, in particular the allocation of identifiers of this subscriber (IMSI [International Mobile Subscriber Identity] number and MSISDN number corresponding to the call number of the subscriber [Mobile Station Integrated Services Digital Network]). This filling of the HLR database is always at the initiative of the CIS information system.

The HLR register thus formed than has autonomous behaviour. The role of the HLR is to check the location of a subscriber customer and to transmit the data relating to the services and to the rights of the subscriber to other equipment in the network when the location is authorised. One of these other items of equipment referred to is in particular the visitor location register VLR.

When a subscriber is located on a network, he comes under the responsibility of a switch of the MSC (Mobile Switching Centre) mobile service coupled to a VLR register. This MSC/VLR first of all constructs an authentication message in order to verify the identity of the SIM [Subscriber Identity Module] card loaded in the terminal of the subscriber. Once the customer is authenticated the MSC/VLR constructs a location request message that it sends, over a type-SS7 (Signalling System Number 7) signalling network, to the HLR central register of the network of the operator. The HLR register then updates, in the database, the current location of the subscriber.

At the time of location, and therefore after authentication, the HLR register verifies that the subscriber terminal has the right to be located (in particular when it is a case of roaming location) and, where appropriate, transmits the data relating to the services available for the subscriber to the VLR register. Even if the HLR register appears to be a simple database, it is a system that directly receives and processes messages or transactions on the signalling network of the operator. In particular, if the HLR register suffers a fault, the telephony network becomes inactive since only the HLR register manages the location updates of the mobile terminals in a general fashion in the network. When one HLR register out of the plurality of HLRs structuring the network becomes faulty, the result is that some subscribers—those managed by the HLR out of commission—can no longer be located, can no longer be called, send or receive SMS (Short Message Service) messages, or benefit from other services on the mobile telephony network.

To meet this problem, there exist procedures for backup of an HLR register by means of which the configuration data of the faulty HLR, previously saved, are reloaded into a backup HLR register. Nevertheless, this procedure requires a period of a few hours and therefore total unavailability of the network, for the subscribers concerned, during this period of time. There is therefore a need to ensure a minimum service to the subscribers within a short period.

Data backup systems for one or more active HLR registers on another dedicated HLR register officiating as a redundant backup HLR are also known. Since the basic data of HLRs are constantly changing, in particular because of the roaming of the subscribers and therefore the updating of the current location in the database, a dynamic saving of the data to the backup HLR is carried out by synchronisation between the latter and the various active HLRs. When an HLR fails, an appropriate signal is sent and makes it possible to switch from the faulty HLR to the associated backup HLR register. Patent application US-2005/081095 describes a solution comprising such mechanisms.

One disadvantage of this solution concerns the large quantity of resources used, in particular by either the deployment of backup HLRs in large numbers in order to provide redundancy for each of the active HLR registers, or the necessity for a backup HLR provided with high processing capacities so as to manage the synchronisation with all the active HLRs and store all the data thereof. The first aim of the invention is to provide a continuity of service solution requiring limited resources in terms of backup equipment for any one of the HLRs that breaks down.

Another disadvantage of this solution concerns the undesired propagation of malfunctionings or errors. This is because, if a data item happens to corrupt an active HLR register, by dynamic synchronisation of the backup HLR or HLRs, this data item will also corrupt these other backup HLRs, giving rise to total unavailability of the network in the case of failure. Another aim of the invention is thus to offer a more secure solution, in particular against the propagation of erroneous or corrupted data.

Another disadvantage of the solution of the prior art lies in the use of part of the bandwidth for synchronisation between HLRs and for the transmission of updating data between them. This gives rise to a reduction in quality of service during consumption peaks by the subscribers. This also generates unnecessary data traffic since a large number of data on the backup HLR are subsequently modified before the backup HLR is used. Another aim of the invention is therefore to provide a continuity of service solution without impact on the data traffic in normal operation of the network.

At least one of these aims is achieved by the present invention by using, as temporary backup, HLR equipment, possibly initially empty of any user data, which, during non-referenced subscriber location demands, on its own initiative actuates the SIC information system in order to recover a minimum of data allowing the identification of the subscriber on the network and therefore its activation. No synchronisation with the active HLRs is necessary, since the data are recovered when necessary on the information system. In addition, the updating data traffic between active HLRs and backup HLRs is avoided. Such a solution can be implemented rapidly since only a simple configuration is required, limited to ensuring the routing of the messages dedicated to the faulty HLR to the backup HLR taking over.

The invention makes it possible in particular to re-establish a minimum service for the subscribers while awaiting recovering a backup HLR with a more complete configuration. To this end, an object of the invention is first of all a nominal location registration device (HLR-S) on a mobile telephony network, the device comprising user data including their current location in the network and processing means arranged to receive a location demand from a user mobile terminal and update the current location of the mobile terminal, the demand emanating from equipment (MSC/VLR) in the network for location of the subscriber terminal. According to the invention, the processing means are arranged to send, when the device does not comprise data associated with the mobile terminal, a request demanding data on the user to an information system (CIS) comprising data on all the users of the network.

Thus, when the HLR device, for example used as a backup HLR for ensuring continuity of services on the mobile telephony network, receives a location demand concerning a subscriber for whom it does not yet have user data, it proceeds with the recovery of key data (IMSI number, MSISDN, for example) on the information system in order to manage a simplified profile of the user. Thus the latter all the same accesses the network and the basic services defined by this simplified profile.

The invention is distinguished in particular from the known solutions by the actuation of a CIS information system at the initiative of an HLR, the backup HLR in this case, in order to recover user data. This is because the prior art puts forward only an initial supply to the HLRs at the initiative of the CIS, without any subsequent connection occurring. In one embodiment, the processing means are arranged to acknowledge the request to the equipment so as to allow the effective activation of the terminal in the network.

Another object of the invention is a service continuity system on a mobile telephony network comprising at least one normal nominal location register (HLR) and a backup nominal location register (HLR-S), the registers comprising user data and being able to process demands for location of user mobile terminals, the demands emanating from at least one item of equipment (MSC/VLR) on the network, an information system (CIS) comprising data on all the users of the network, and switch means arranged to route, when the normal register (HLR) is faulty, the location demands to the backup register (HLR-S). The invention is particularized in that the backup nominal location register (HLR-S) is arranged to send, on reception of a demand to locate a mobile terminal and when the backup register (HLR-S) does not comprise user data associated with the mobile terminal, a request to demand user data of the information system (CIS).

The backup register HLR thus does not need to be pre-configured. The data relating to the subscribers are enhanced along with new terminal connection and location demands, by the recovery of data from the general information system CIS. When the normal HLR is faulty, the location demands are then re-routed to the backup HLR, an ad hoc configuration being able to be required. The backup HLR then appears in the network as being the active HLR. The location demands, the demands relating to the incoming calls or SMSs are then sent to it. The traditional functioning of the network is consequently only a little altered.

In one embodiment, the user data stored on the registers (HLR, HLR-S) comprise data relating to the current location of the mobile terminals, the registers (HLR, HLR-S) also being arranged so as to update the data relating to the current location during the processing of the location demands. In one configuration of the invention, the normal register is identified on a signalling network (SS7), belonging to the mobile telephony network, by at least one address (generally by an SCCP address and an MPT address for the SS7 network), the location demands being sent over the signalling network to the address, the switching means comprising a user interface arranged to parameterise the backup register with the address so as to route the location demands to the backup register (HLR-S). This configuration of the backup register is advantageously simple to allow the functioning of the solution according to the invention. Because of the parameterising of the backup HLR with the "active"address of the HLR, the location demands are automatically routed to the new active HLR, that is to say the backup HLR brought into service.

A variant of this configuration, applied solely when the failure of the main HLR occurs, consists of pre-parameterising the global routing network in order to take account of a main routing address corresponding to the normal HLR and a second-choice address corresponding to the backup HLR. This default configuration in the network makes it possible, in the event of failure, in order to join an HLR to its MTP address (low-layer SS7 routing), to route as a second choice to the backup HLR (the case of failure of the normal HLR). The network thus automatically proceeds with the routing of the requests or demands to the backup HLR, and no configuration of the backup HLR is then necessary. To this end, the switch means comprise the pre-parameterising of the network by indicating, in the MTP signalling protocol layer of the network, a first address of the normal register and a second address of the backup register, the routing of the location demands on the network automatically switching to the second address when the normal register is faulty.

According to two embodiments:
- the backup register (HLR-S) comprises a default profile of services available on the network and is arranged to allocate the default profile to the mobile terminal;
- the backup register (HLR-S) comprises a plurality of profiles of services available on the network and is arranged to allocate one of the profiles to the mobile terminal according to data returned by the information system (CIS) in response to the request.

In the first variant, the management is simplified by the use of a single profile for all the subscribers. This profile allows access to the basic services of the mobile telephony network, in this case the connection and establishment of communication from and to the subscriber. The transmission of SMS messages may possible integrate this profile. In the second variant, several profiles exist, in particular profiles relating to the nature of the subscriptions of the users with a view to invoicing. The HLR register then recovers, on the information system, data from which a profile choice can be made, for example the type of subscription, "prepaid" or "postpaid", associated with the subscriber.

Another object of the invention is a service continuity method on a mobile telephony network, in which location demands for mobile terminals emanate from at least one item of network equipment (MSC/VLR) in order to be processed by at least one normal nominal location register (HLR), the method comprising a step of routing the location demands to a backup nominal register (HLR-S) when the normal register (HLR) is faulty and, in addition, on reception of a location demand for a mobile terminal, a subsequent step according to which the backup register (HLR-S) sends, when the backup register (HLR-S) does not comprise user data associated with the mobile terminal, a request to demand user data of an information system (CIS) comprising data on all the users of the network.

By this mechanism, the non-preconfigured backup HLR accesses the useful data to effectively permit the maintenance of the minimum services with regard to mobile telephony. The actuation of the information system makes it possible to dispense with extensive hardware resources and synchronised backup operations during the normal functioning of the network. It should be noted that the authentication messages represent approximately 30% to 40% of the number of messages exchanged over an SS7 network, In one embodiment, the method comprises, prior to the routing step, a step of deactivation of authentication mechanisms of the mobile terminals at the at least one item of network equipment (MSC/VLR). This deactivation limits the exchanges between the VLR equipment and the backup HLR recorder, and consequently also limits the quantity of data to be recovered from the information system CIS (the data relating to identification, for example a secret key, are no longer useful). This limitation of the quantity of data to be recovered proves to be important when setting up the backup register. This is because, on switching to the backup HLR according to the invention, a large number of subscribers then attempt to locate, which gives rise to a large number of connections between this backup HLR and the information system. The deactivated authentication thus makes it possible to avoid overloading the network when the HLR breaks down.

Nevertheless, it is possible to effect the backup without deactivating the authentication. For this purpose the CIS must, in addition to the IMSI, transmit the enciphering key to the backup HLR. The function AuC (Authentication Centre) must, for its part, be activated in the backup HLR so that it can form the authentication triplets and transmit them to the MSV/VLR in order to authenticate the mobile terminal. To permit the rerouting of the location demands to the new backup HLR, it is useful to configure the latter. For this purpose, provision is made for the normal register (HLR) to be identified on a signalling network (SS7), belonging to the mobile telephony network, by an address, the location demands being sent over the signalling network to the address, the method comprising a step of configuring the backup register (HLR-S) with the address in the signalling network so as to route the location demands to the backup register (HLR-S). According to a variant, it is envisaged that the network is pre-parameterised in order to give a main routing address identifying the normal register and a second routing address indicating the backup register, the routing of the location demands on the network being effected, in normal operation, to the main address and automatically switching, when the normal register is faulty, to a routing to the second address.

In one embodiment, the request concerns a demand for a network identifier of the mobile terminal (MSISDN). In a conventional use of the HLR registers aimed at storing the actual location of the subscribers, provision is made for the registers (HLR, HLR-S) to comprise data relating to the current location of the mobile terminals, the method comprising a step of processing the location demand for a mobile terminal by the register receiving the demand, the processing comprising the updating of the current location of the mobile terminal.

In one embodiment, the method also comprises a step of allocating, by the backup register (HLR-S), a profile to the mobile terminal, the profile being a profile of services available on the network. This profile can be defined by default. More particularly, according to an alternative to the single default profile, the profile allocated is chosen from a plurality of profiles according to data returned by the information system (CIS) in response to the request.

BRIEF DESCRIPTION OF THE DRAWINGS

The invention will be better understood with the help of the description, given below purely by way of explanation, of an embodiment of the invention, with reference to the accompanying FIGURE:

FIG. 1 illustrates an example of a network architecture for implementing the invention.

DETAILED DESCRIPTION

FIG. 1 depicts a mobile telephony network 1 including a transport network SS7 of the signalling type in which a nominal location register HLR 2 is used for managing the connection and location of mobile terminals 3 of subscribers to the network. A commercial information system CIS 10 comprises a database 11 containing all the data relating to the subscribers. When one of them subscribes with the operator owning the network 1, the appropriate commercial service records the traditional data of the subscriber (name, address, bank details, etc) and the identifiers that are allocated to him for his identification on the network: IMSI number associated with the SIM card supplied, MSISDN number corresponding to the "traditional" telephone number of the subscriber, to which he can be joined. When the registration is valid, that is to say the subscriber can use the network 1, some of the data allowing in particular the identification of the subscriber on the network are transmitted (see discontinuous arrow 12 FIG. 1) by "push" (push model where the transmission is at the initiative of the sender only, here the CIS 10) from the information system 10 to the HLR 2.

The main functionalities of a nominal location register concern:

the management of the mobility of the subscribers through the updating of their position within administrative zones dividing up the network (network cell). The roaming of the subscriber from one cell to another is followed by the HLR by means of data updated in a base of the HLR. This updating follows the sending by connection equipment (4, 5) of a location demand triggered by the connection of the mobile 3. This network connection equipment is in particular the switching centre MSC 4 and the visitor location register VLR 5 dedicated to some of the cells of the network. When there are several HLRs 2 on the network, a virtual HLR 8 performs an operation of routing all the location demands sent to the HLR of the network to the HLR to which the subscriber relates. Such a virtual HLR 8 makes it possible to optimize the filling of the HLRs 2. Generally the HLR 2 stores the location of the terminal 3, not at the close-by radio communication cell of the network, but at a close-by radio zone associated with MSC/VLR equipment 4/5 (which thus manages all the radio cells making up the zone). The location demand 50 is made through the MAP (Mobile Application Part) protocol by the transmission of messages between the MSC/VLR and the HLR. In particular, the MSC/VLR sends the IMSI identifier of the subscriber 3 (recovered on the terminal;

the transmission to the VLR-type connection equipment (4, 5) of data of the subscriber when the latter connects for the first time in one of the cells under the control of this equipment. This transmission is a response to the demand 50 by means of which the HLR sends to the MSC/VLR the call number MSISDN as well as the services that the subscriber has the right to use.

Additionally, the HLR also transmits data for the functioning of related equipment, such as the SMS server or gateways to other networks, and removes data on the use of an old VLR register when the subscriber has left the zone to which this VLR relates. In practice, there is also provided a prior authentication of the subscriber connecting for the first time in the zone controlled by an MSC/VLR. This procedure is already known by the term *Send Authentication Info* in versions 2 and 3 of the MAP protocol and *Send Parameters* in version 1.

When the normal HLR 2 suffers damage, the administrator of the network 1 configures the latter so that a backup nominal location register HLR 6 according to the invention takes over from the faulty HLR 2. This backup HLR 6 comprises all the main functionalities of the HLRs with the exception that it in principle contains no data relating to the users. This makes it possible to use it whatever the HLR equipment 2 that has broken down among all the HLRs in the network. Because of this, a single HLR of normal sizing is necessary to supplement a faulty register. Its database is then filled as follows, as the network is used by the subscribers initially "registered" on the faulty HLR 2.

The configuration of the network for switching to this backup HLR 6 is implemented by:
 a possible deactivation of the authentication on all the MSCs/VLRs 4/5 in the network. This deactivation makes it possible to avoid the saturation of the SS7 network during this type of fault through an excessively large number of sendings in the form of repeats of authentication demands to the HLR 2; and
 the switching of the links to the faulty HLR towards the buffer HLR.

One way of achieving this effective switching is to directly parameterise the STP (signalling transfer point) switches 7 or any routing equipment in the network in order to route the demands to the backup HLR. In this embodiment, it is also envisaged that this equipment be pre-parameterised in order to route automatically to the normal HLR, in normal functioning, and by default to the backup HLR when the normal HLR does not respond. It is in particular the MTP protocol layer of the signalling network SS7 that is parameterised to indicate these at least two routing addresses.

A favoured variant is to configure the backup HLR 6 with the SCCP (Signalling Connection Control Part) and MTP (Message Transfer Part—Point Code) addresses of the faulty normal HLR 2 by means of a suitable user interface. In doing this, the messages/requests sent to the normal HLR 2, independently of knowing whether or not the latter is operational, are automatically distributed to the new backup HLR 6. Thus, after its reconfiguration, the backup HLR 6 appears in the network as the faulty HLR 2. The location demands, the demands relating to the incoming calls or SMSs that concern subscribers associated with the faulty HLR 2 are therefore sent to it. The other demands are transmitted to the other HLRs.

In operation and according to the filling of its database, when the backup HLR 6 receives a location demand, either it holds data in the base relating to the subscriber concerned and proceeds with a traditional processing of the demand (updating of the location, transmitting supplementary data relating to any services) or, if no data of the subscriber is present in the base, it transmits a request 13 to the CIS 10 in order to obtain the MSISDN number of the subscriber.

Once the MSISDN is returned by the CIS 10 and obtained by the backup HLR 6, the latter behaves like a normal HLR and responds to the VLR 5 by authorizing the location and transmitting a generic profile of services authorised to the subscriber. This generic profile makes it possible to call, to be called, to send or to receive SMSs. The backup HLR 6 notes the VLR where the customer is located as any VLR would do:

updating of the location of the subscriber in the base. More complex exchanges can then be established between the backup HLR 6 and the MSC/VLR 4/5, in particular in order to obtain from the latter mobile station roaming numbers MSRN for routing the incoming calls to the MSC.

By limiting the subscriber data held by the backup HLR 6 to those (limited to respond rapidly to demands) recovered from the CIS 10, not all the services are ensured since these depend on the number of items of information transmitted by the CIS. The main services that are ensured concern:
 the sending of a call,
 the reception of a call,
 the sending of SMSs,
 the reception of SMSs,
 the VMS (Voice Messaging System) service, voice box.

Other embodiments of the invention can be envisaged. In particular, the CIS 10, in response to the request 13, can transmit information relating to the fact that the subscriber corresponds to a prepaid contract or to a post-paid use. The backup HLR 6 can then be pre-configured to manage at least two "type" profiles of subscribers corresponding to subscriptions of the post-paid type and the prepaid type. The allocation of a profile to the subscriber by the backup HLR 6 is then carried out according to the information received in response to the request 13. This embodiment increases the quality of service to users by targeting the authorised services precisely.

The system according to the invention has the advantage of offering a rapid deployment of backup equipment that can be allocated to any faulty HLR equipment. Such a solution can therefore be superimposed on redundant HLR solutions already existing but whose setting up may require significant time for deployment or configuration. The backup HLR according to the invention then takes over during this time whilst ensuring a minimum service quality for subscribers.

The invention claimed is:

1. A service continuity system on a mobile telephony network, comprising:
 at least one nominal location register comprising user data;
 a backup nominal location register, the backup nominal location register supplementing the nominal location register in the case of failure of the nominal location register, said backup nominal location register being initially empty from user data, the nominal location register and the backup nominal location register being able to process location demands for user mobile terminals, the demands emanating from at least one item of equipment in the network;
 an information system comprising data on all the users of the network; and
 a switch arranged to route, when the nominal location register is faulty, the location demands to the backup nominal location register;
 wherein the backup nominal location register is arranged to send, on reception of a location demand for a mobile terminal and when the backup register does not comprise user data associated with the mobile terminal, a request for user data to the information system,
 the backup nominal location register being configured to receive the user data associated with the user mobile terminal from the information system and to supplement whichever of the at least one nominal location register is determined to be faulty.

2. The system according to claim 1, in which the user data stored on the nominal location register and the backup nominal location register comprise data relating to the current location of the mobile terminals, the nominal location register and the backup nominal location register also being arranged to update the data relating to the current location during the processing of the location demands.

3. The system according to claim 1, in which the nominal location register is identified on a signalling network, belonging to the mobile telephony network, by at least one address, the location demands being sent over the signalling network to the address, the switch comprising a user interface used to parameterise the backup nominal location register with the address so as to route the location demands to the backup register.

4. The system according to claim 1, in which the switch comprises the pre-parameterising of the network by indicating, in the signalling Message Transfer Part protocol layer of the network, a first address of the nominal location register and a second address of the backup nominal location register, the routing of the location demands on the network automatically switching to the second address when the nominal location register is faulty.

5. The system according to claim 1, in which the backup register comprises a default profile of services available on the network and is arranged to allocate the default profile to the mobile terminal.

6. The system according to claim 1, in which the backup register comprises a plurality of profiles of services available on the network and is arranged to allocate one of the profiles to the mobile terminal according to data returned by the information system in response to the request.

7. The system according to claim 1, wherein the user data relating to a simplified profile of the user, so as to allow effective activation of the mobile terminal on the network, wherein the simplified profile is used for all the users of the network and is associated with simplified services, so as to allow effective activation of the mobile terminal on the network, the user being allowed to access said basic services on the network.

8. The system according to claim 7, wherein the user data relates to a simplified profile of the user, wherein the single simplified profile is used for all the users of the network and is associated to basic services, so as to allow effective activation of the mobile terminal on the network, the user being allowed to access said basic services on the network.

9. The system according to claim 7, wherein the request relates to at least one network identifier (MSISDN) of the mobile terminal.

10. A service continuity method on a mobile telephony network, in which location demands for mobile terminals emanate from at least one item of network equipment in order to be processed by at least one nominal location register, the nominal location register including user data, the method comprising:
   routing the location demands to a backup nominal location register when the nominal location register is faulty, said backup nominal location register being initially empty from user data stored in the at least one nominal location register;
   on reception of a location demand for a mobile terminal and when the backup nominal location register does not comprise user data associated with the mobile terminal, sending by said backup nominal location register a request demanding user data of an information system comprising data on all the users of the network;
   receiving the user data associated with the user mobile terminal from the information system; and
   supplementing, by the backup nominal location register, the faulty nominal location register using the received user data.

11. The method according to claim 10, comprising, prior to the routing step, a step of deactivation of authentication mechanisms for the mobile terminals with the at least one item of network equipment.

12. The method according to claim 10, in which the nominal location register is identified on a signalling network (SS7), belonging to the mobile telephony network, by an address, the location demands being sent over the signalling network to the address; configuring the backup nominal location register with the address in the signalling network so as to route the location demands to the backup register.

13. The method according to claim 12, in which the request concerns a demand for a network identifier for the mobile terminal (MSISDN).

14. The method according to claim 10, in which the network is pre-parameterised in order to give information on a main routing address identifying the nominal location register and a second routing address indicating the backup nominal location register;
   the routing of the location demands over the network being carried out, in normal operation, to the main address and automatically switching, when the nominal location register is faulty, to a routing to the second address.

15. The method according to claim 10, in which the nominal location register and the backup register comprise data relating to the current location of the mobile terminals, and processing the location demand for a mobile terminal by the nominal location register or backup nominal location register receiving the demand, the processing comprising the updating of the current location of the mobile terminal.

16. The method according to claim 10, comprising a step of allocation, by the backup nominal location register, of a profile to the mobile terminal, the profile being a profile of services available on the network.

17. The method according to claim 10, in which the allocated profile is chosen from a plurality of profiles according to data returned by the information system in response to the request.

18. The method according to claim 10, wherein the user data relates to a simplified profile of the user, wherein the single simplified profile is used for all the users of the network and is associated to basic services, so as to allow effective activation of the mobile terminal on the network, the user being allowed to access said basic services on the network.

19. The method according to claim 18, further comprising allowing the mobile terminal of the user access to the basic services on the network when the mobile terminal is activated on the network using the simplified profile.

20. A service continuity system on a mobile telephony network, comprising:
   a plurality of nominal location registers configured to process location demands for user mobile terminals received from at least one item of equipment in the mobile telephone network, the nominal location registers of the plurality of nominal location registers comprising user data; and
   a backup nominal location register, the backup nominal location initially not containing any user data, wherein the backup nominal location is configured to process location demands for user mobile terminals received from at least one item of equipment in the network;
   an information system comprising user data on all the users of the network; and a switch arranged to route the location demands intended for a nominal location register from the plurality of nominal location registers to the backup nominal location register when one of the plurality of nominal location register is faulty, wherein the backup nominal location register is arranged to send, upon receipt of a location demand for a user mobile terminal having user data associated therewith which is not stored on the backup register, a request for the user data associated with the mobile terminal to the information system, and wherein the backup nominal location register receives the user data associated with the user mobile terminal from the information system and supplements the one of the plurality of nominal location register that is faulty.

\* \* \* \* \*